(12) United States Patent
Rapaport et al.

(10) Patent No.: US 11,386,465 B1
(45) Date of Patent: Jul. 12, 2022

(54) METHOD AND APPARATUS FOR PROVIDING PROMOTION VOUCHERS

(71) Applicant: Groupon, Inc., Chicago, IL (US)

(72) Inventors: Tali Rapaport, San Francisco, CA (US); J. Gray Sandridge, Palo Alto, CA (US)

(73) Assignee: GROUPON, INC., Chicago, IL (US)

( * ) Notice: Subject to any disclaimer, the term of this patent is extended or adjusted under 35 U.S.C. 154(b) by 979 days.

(21) Appl. No.: 14/557,042

(22) Filed: Dec. 1, 2014

Related U.S. Application Data

(60) Provisional application No. 61/910,926, filed on Dec. 2, 2013.

(51) Int. Cl.
*G06Q 30/02* (2012.01)

(52) U.S. Cl.
CPC ..... *G06Q 30/0276* (2013.01); *G06Q 30/0222* (2013.01)

(58) Field of Classification Search
CPC .............. G06Q 30/02; G06Q 30/0276; G06Q 30/0222; G06Q 30/0207–30/0277
See application file for complete search history.

(56) References Cited

U.S. PATENT DOCUMENTS

| | | | | |
|---|---|---|---|---|
| 6,370,514 B1* | 4/2002 | Messner | ............... | G06Q 20/02 705/14.26 |
| 7,209,889 B1* | 4/2007 | Whitfield | ............... | G06Q 30/02 705/72 |
| 7,788,129 B2* | 8/2010 | Antonucci | ......... | G06Q 20/3437 705/14.23 |
| 8,046,266 B1* | 10/2011 | Geller | ............... | G06Q 30/0223 705/14.1 |
| 8,200,545 B2* | 6/2012 | Hunt | ............... | G06Q 30/0601 705/26.1 |
| 8,285,643 B2* | 10/2012 | Isaacson | ............... | G06Q 30/06 705/41 |
| 9,477,957 B2* | 10/2016 | Bodman | ............... | G06Q 20/32 |
| 9,558,483 B2* | 1/2017 | Gupta | ............... | G06Q 20/28 |
| 9,785,992 B2* | 10/2017 | Glass | ............... | G06Q 30/0621 |
| 2007/0203788 A1* | 8/2007 | Andalib | ............. | G06Q 30/0215 705/14.17 |
| 2008/0048023 A1* | 2/2008 | Russell | ............... | G06Q 20/342 235/380 |
| 2008/0052164 A1* | 2/2008 | Abifaker | ............... | G06Q 40/02 705/14.27 |
| 2008/0249887 A1* | 10/2008 | Cao | ............... | G06Q 40/04 705/27.1 |
| 2009/0240587 A1* | 9/2009 | Emanuele | ......... | G06Q 30/0222 705/14.23 |
| 2009/0288012 A1* | 11/2009 | Hertel | ............... | G06Q 20/326 715/738 |

(Continued)

*Primary Examiner* — Thuy N Nguyen
(74) *Attorney, Agent, or Firm* — Alston & Bird LLP

(57) ABSTRACT

A method, apparatus, and computer program product are disclosed to provide improved use and generation of promotion vouchers. The method may include receiving an indication of redemption for a particular promotion voucher, determining a promotion type associated with the particular promotion voucher, and presenting an e-commerce interface for redemption of the promotion voucher for at least one promotion, wherein the at least one promotion is of the determined promotion type. Apparatuses and computer readable media are also provided.

18 Claims, 9 Drawing Sheets

(56) References Cited

U.S. PATENT DOCUMENTS

| | | | |
|---|---|---|---|
| 2010/0017278 A1* | 1/2010 | Wilen | B42D 15/045 705/14.2 |
| 2010/0078474 A1* | 4/2010 | Rosenblatt | G06Q 30/02 235/380 |
| 2010/0299194 A1* | 11/2010 | Snyder | G06Q 30/0211 705/14.13 |
| 2011/0047039 A1* | 2/2011 | Crames | G06Q 30/0643 705/18 |
| 2011/0196724 A1* | 8/2011 | Fenton | G06Q 50/01 705/14.16 |
| 2011/0213675 A1* | 9/2011 | Friedman | G06Q 40/02 705/26.7 |
| 2011/0231269 A1* | 9/2011 | Mulhall | G06Q 20/204 705/26.1 |
| 2012/0095819 A1* | 4/2012 | Li | G06Q 30/02 705/14.23 |
| 2012/0101888 A1* | 4/2012 | Rothschild | G06Q 30/02 705/14.23 |
| 2012/0150611 A1* | 6/2012 | Isaacson | G06Q 30/0226 705/14.27 |
| 2012/0150643 A1* | 6/2012 | Wolfe | G06Q 20/34 705/41 |
| 2012/0150743 A1* | 6/2012 | Isaacson | G06Q 30/06 705/41 |
| 2012/0271697 A1* | 10/2012 | Gilman | G06Q 20/387 705/14.23 |
| 2012/0284105 A1* | 11/2012 | Li | G06Q 30/02 705/14.23 |
| 2012/0290308 A1* | 11/2012 | Detwiller | G06Q 30/02 705/1.1 |
| 2012/0310983 A1* | 12/2012 | Mittal | G06F 21/6209 707/E17.005 |
| 2012/0316975 A1* | 12/2012 | Schorr | G06Q 30/0613 705/16 |
| 2013/0006856 A1* | 1/2013 | Aoki | G06Q 40/00 705/41 |
| 2013/0073371 A1* | 3/2013 | Bosworth | G06Q 30/0207 705/14.1 |
| 2013/0080321 A1* | 3/2013 | Mulhall | G06Q 30/02 705/41 |
| 2013/0085930 A1* | 4/2013 | Isaacson | G06Q 30/0224 705/39 |
| 2013/0117188 A1* | 5/2013 | Baker, III | G06Q 30/0269 705/304 |
| 2013/0144732 A1* | 6/2013 | Rothschild | G06Q 20/0457 705/17 |
| 2013/0191173 A1* | 7/2013 | Shobola | G06Q 50/12 705/5 |
| 2013/0204739 A1* | 8/2013 | Friedman | G06Q 30/02 705/26.7 |
| 2013/0246195 A1* | 9/2013 | Berry | G06Q 30/0242 705/14.72 |
| 2013/0275250 A1* | 10/2013 | Rodell | G06Q 30/0208 705/26.1 |
| 2013/0304559 A1* | 11/2013 | Stone | G06Q 30/0233 705/14.33 |
| 2013/0332258 A1* | 12/2013 | Shiffert | G06Q 30/0267 705/14.39 |
| 2014/0025470 A1* | 1/2014 | Berman | G06Q 30/0235 705/14.26 |
| 2014/0108177 A1* | 4/2014 | Erke | G06Q 30/0601 705/26.1 |
| 2014/0207545 A1* | 7/2014 | Berman | G06Q 30/06 705/14.13 |
| 2014/0222591 A1* | 8/2014 | Baradoy | G06Q 20/387 705/14.72 |
| 2014/0289077 A1* | 9/2014 | Osman | G06Q 20/387 705/26.41 |
| 2015/0025950 A1* | 1/2015 | Yu | G06Q 30/0274 705/14.7 |
| 2015/0213441 A1* | 7/2015 | Wilen | G06Q 90/00 235/494 |

\* cited by examiner

600

GROUPON*

Hello <Recipient>

<Sender> sent you a $15.00 USD eGift Card for Groupon.

To view your eGift Card, just click the link below:

VIEW MY EGIFT CARD

You can also copy and paste the following address into your web browser:
https://groupon.cashstar.com/gift-card/view/DtkV7Y7kL00jjEB/

Have a question about your eGift Card?

Click here to access our customer support tools. You can also email us anytime at groupongiftcardsupport@cashstar.com or call 1-888-925-3415 from 8:00 AM to 8:00 PM EST, seven days a week.

Enjoy your gift!

Thanks,

Groupon

P.S. If you'd like to thank <Sender> send a note to <Sender E-mail>

METHOD AND APPARATUS FOR PROVIDING PROMOTION VOUCHERS

CROSS REFERENCE TO RELATED APPLICATIONS

This application claims the benefit of U.S. Provisional Application No. 61/910,926, filed Dec. 2, 2013, and herein incorporated by reference in its entirety.

TECHNOLOGICAL FIELD

Example embodiments of the present invention relate generally to providing promotions and, more particularly, to a method and apparatus for providing promotion vouchers.

BACKGROUND

Applicant has discovered problems with current methods for providing promotions to consumers. Through applied effort, ingenuity, and innovation, Applicant has solved many of these identified problems by developing a solution that is embodied by the present invention, which is described in detail below.

BRIEF SUMMARY

Accordingly, a method, apparatus, and computer program product are provided for providing promotion vouchers. Example embodiments may include a method for providing promotion vouchers which may be redeemable for a particular type of promotion. An example embodiment of the method may include receiving a set of promotion parameters, the promotion parameters comprising a type of promotion selected from a plurality of promotion types offered by a promotion and marketing service, generating a promotion voucher using the promotion parameters, wherein the promotion voucher is associated with the selected type of promotion, and providing the promotion voucher to a recipient.

An example embodiment of an apparatus for providing a promotion voucher may include an apparatus comprising at least one processor and a memory. The memory may comprise instructions that, when executed by the at least one processor, cause the at least one processor to configure the apparatus to receive a set of promotion parameters, the promotion parameters comprising a type of promotion selected from a plurality of promotion types offered by a promotion and marketing service, generate the promotion voucher using the promotion parameters, wherein the promotion voucher is associated with the selected type of promotion, and provide the promotion voucher to a recipient.

An example embodiment of a non-transitory computer readable storage medium for providing a promotion voucher may include instructions that, when executed by a processor, cause the processor to configure an apparatus to receive a set of promotion parameters, the promotion parameters comprising a type of promotion selected from a plurality of promotion types offered by a promotion and marketing service, to generate the promotion voucher using the promotion parameters, wherein the promotion voucher is associated with the selected type of promotion, and to provide the promotion voucher to a recipient.

Another example embodiment of a method for providing a promotion voucher may include receiving an indication of redemption for a particular promotion voucher, determining a promotion type associated with the particular promotion voucher, and presenting an e-commerce interface for redemption of the promotion voucher for at least one promotion, wherein the at least one promotion is of the determined promotion type.

Another example embodiment of an apparatus for providing a promotion voucher may include an apparatus comprising at least one processor and a memory. The memory may comprise instructions that cause the apparatus to receive an indication of redemption for a particular promotion voucher, to determine a promotion type associated with the particular promotion voucher, and to present an e-commerce interface for redemption of the promotion voucher for at least one promotion, wherein the at least one promotion is of the determined promotion type.

Another example embodiment of a non-transitory computer readable storage medium for providing a promotion voucher may include comprising instructions that, when executed by a processor, cause the processor to configure an apparatus to receive an indication of redemption for a particular promotion voucher, to determine a promotion type associated with the particular promotion voucher, and to present an e-commerce interface for redemption of the promotion voucher for at least one promotion, wherein the at least one promotion is of the determined promotion type.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
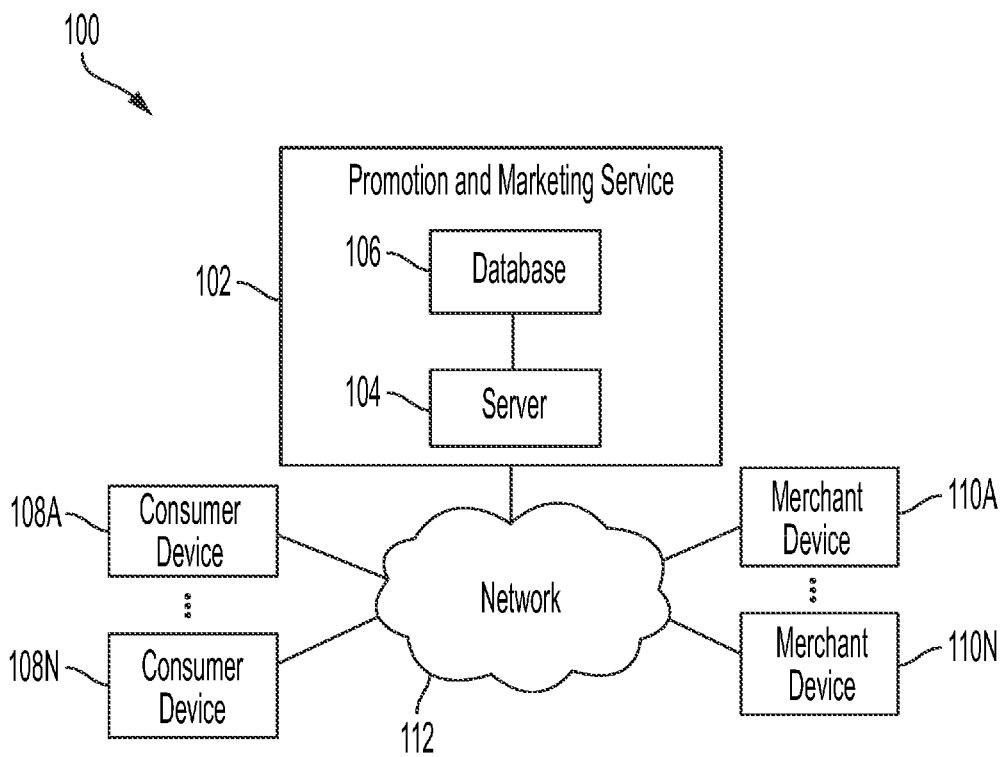
Figure 2:
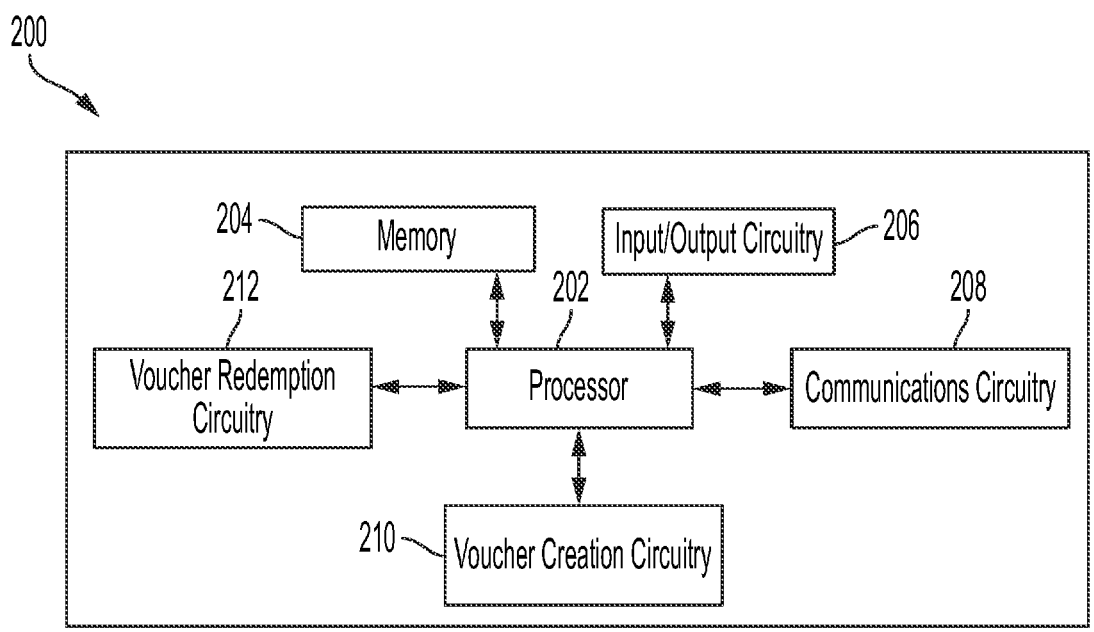
Figure 3:
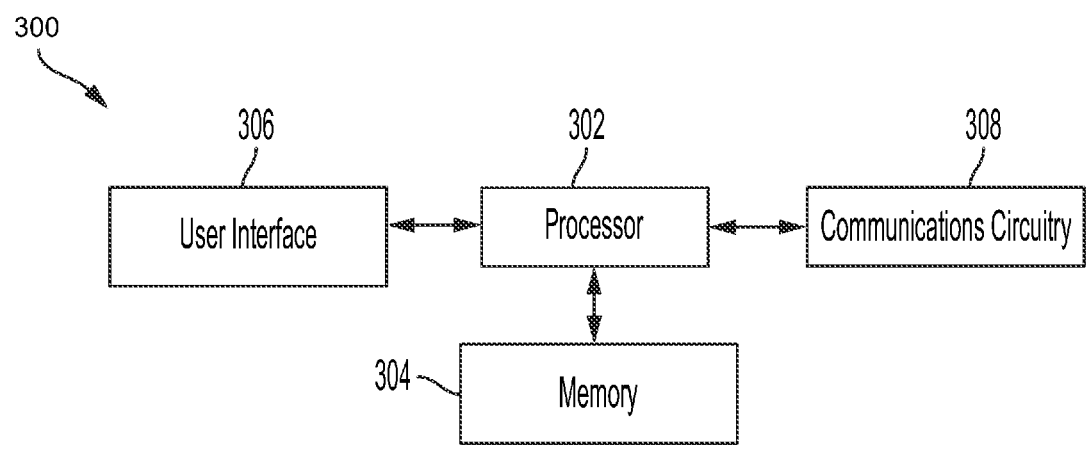
Figure 4:
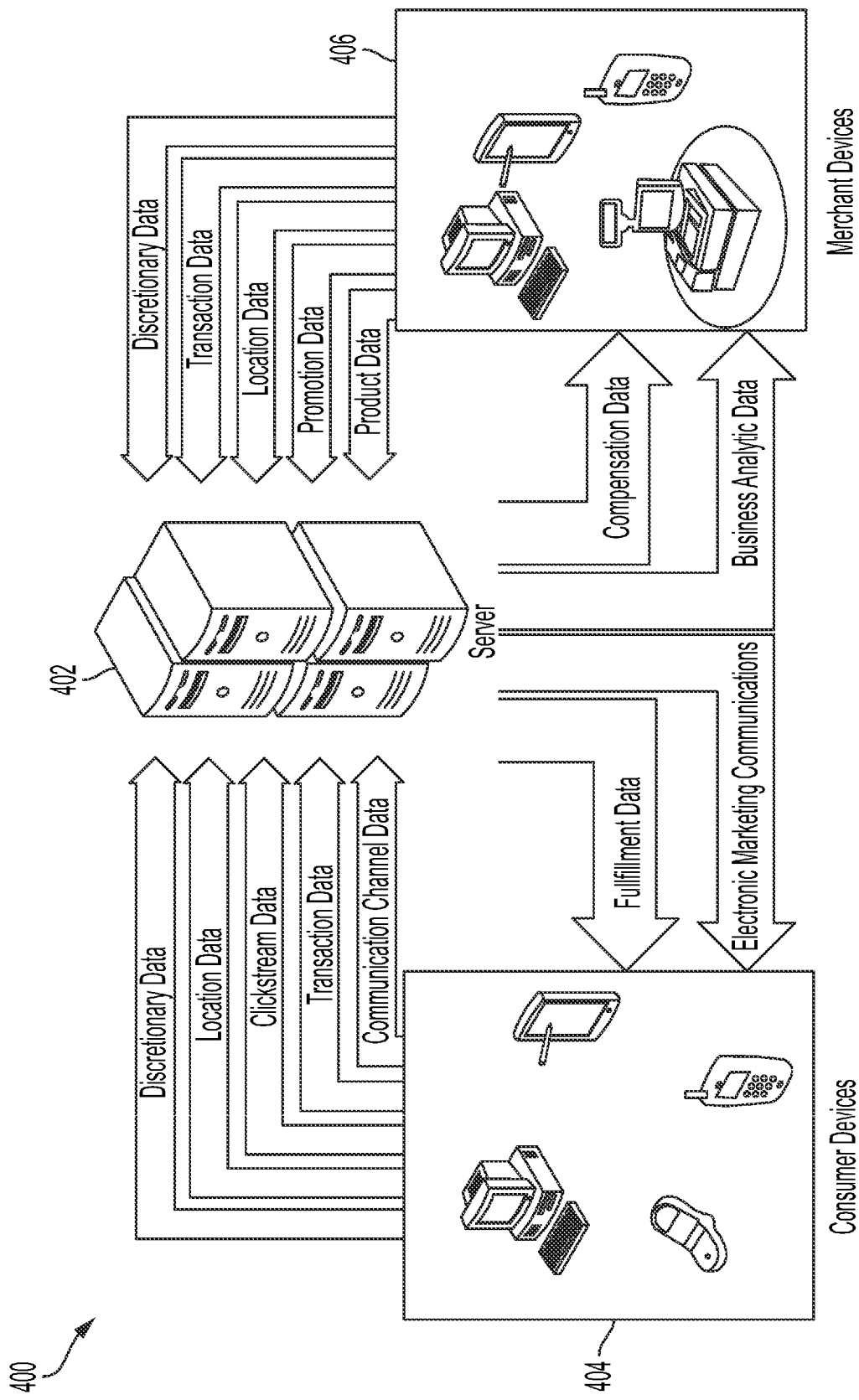

Having thus described certain example embodiments of the present disclosure in general terms, reference will now be made to the accompanying drawings, which are not necessarily drawn to scale, and wherein:

FIG. 1 illustrates an example system within which embodiments of the present invention may operate;

FIG. 2 illustrates a block diagram showing an example device for use in a promotional server, in accordance with some example embodiments of the present invention;

FIG. 3 illustrates a block diagram showing an example device for use by a consumer, sales representative or merchant, in accordance with an example embodiment of the present invention;

FIG. 4 illustrates an example of a data flow for interactions among a consumer device, merchant device, and server in accordance with some example embodiments of the present invention.

Figure 5:
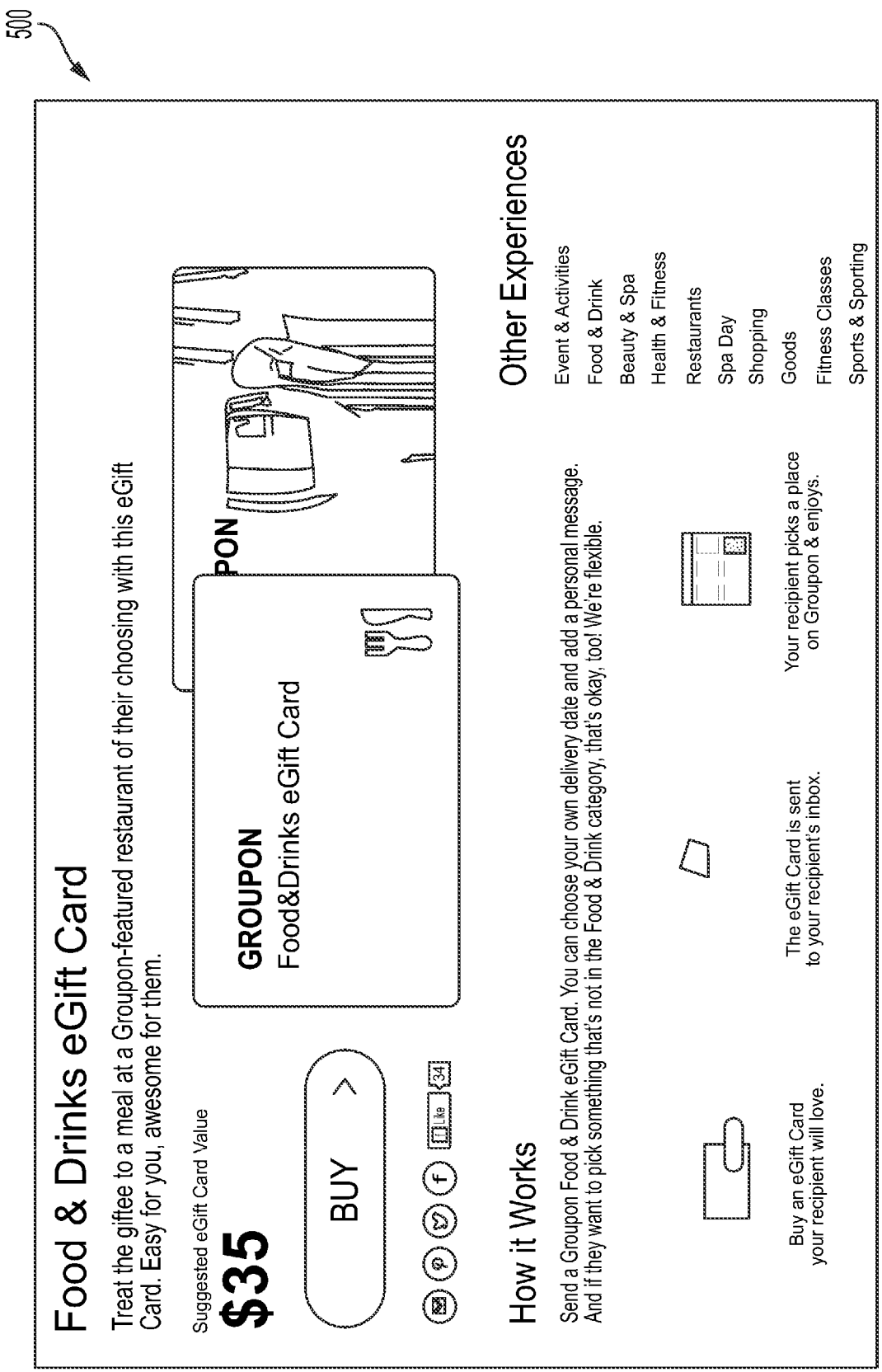
Figure 7:
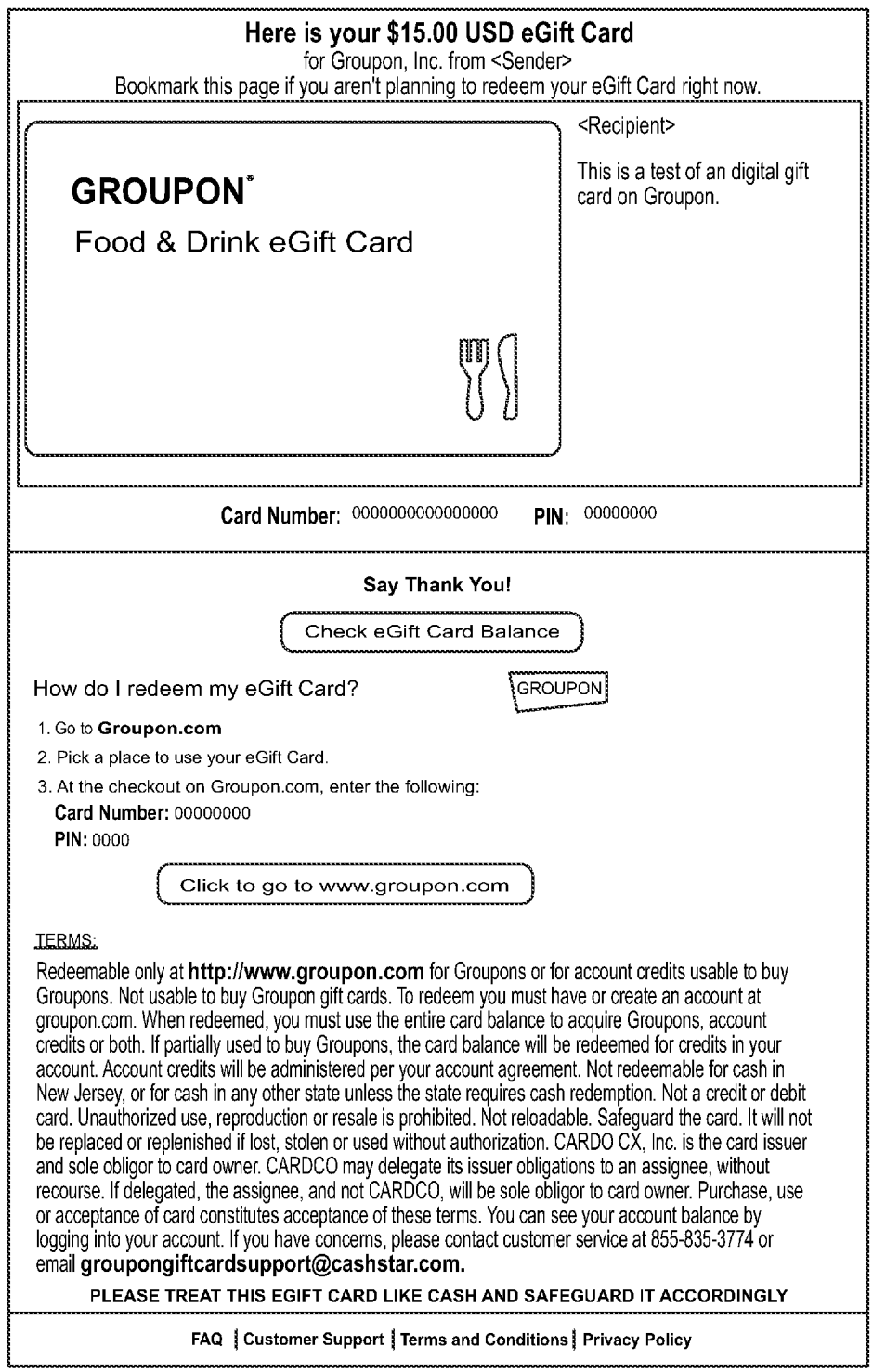
Figure 9:
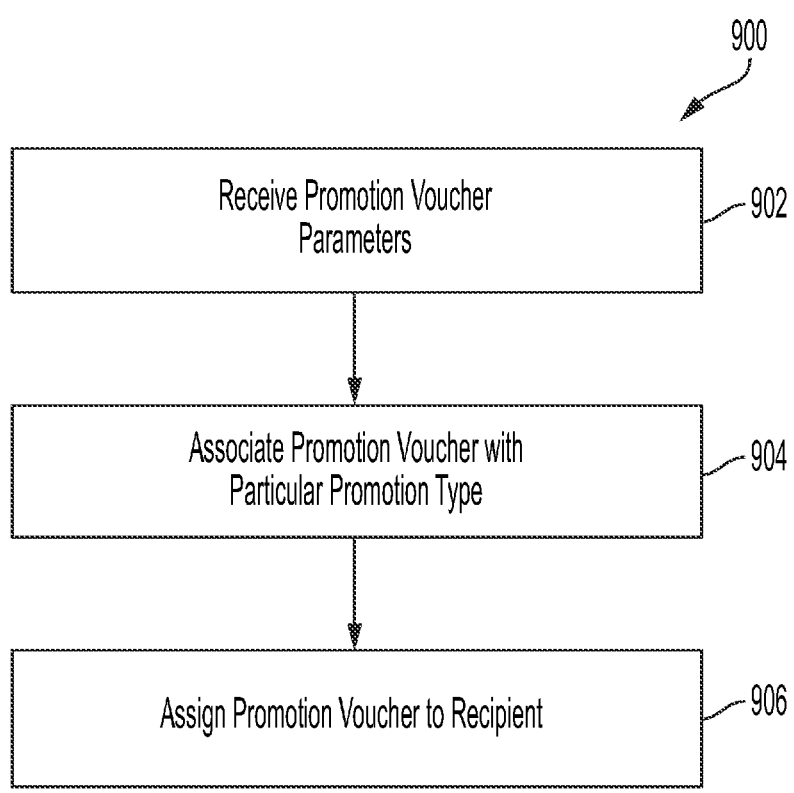
Figure 10:
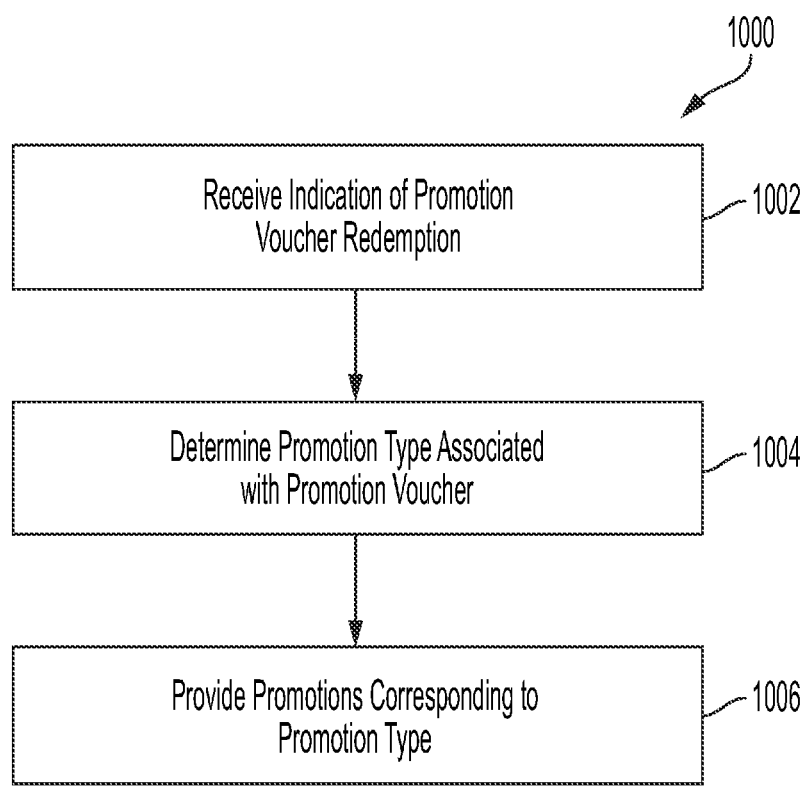

FIG. 5 illustrates an example interface for selecting a promotion voucher in accordance with some example embodiments;

FIG. 6 illustrates an example interface for receiving a promotion voucher in accordance with some example embodiments;

FIG. 7 illustrates an example interface for viewing a received promotion voucher in accordance with some example embodiments;

Figure 8:
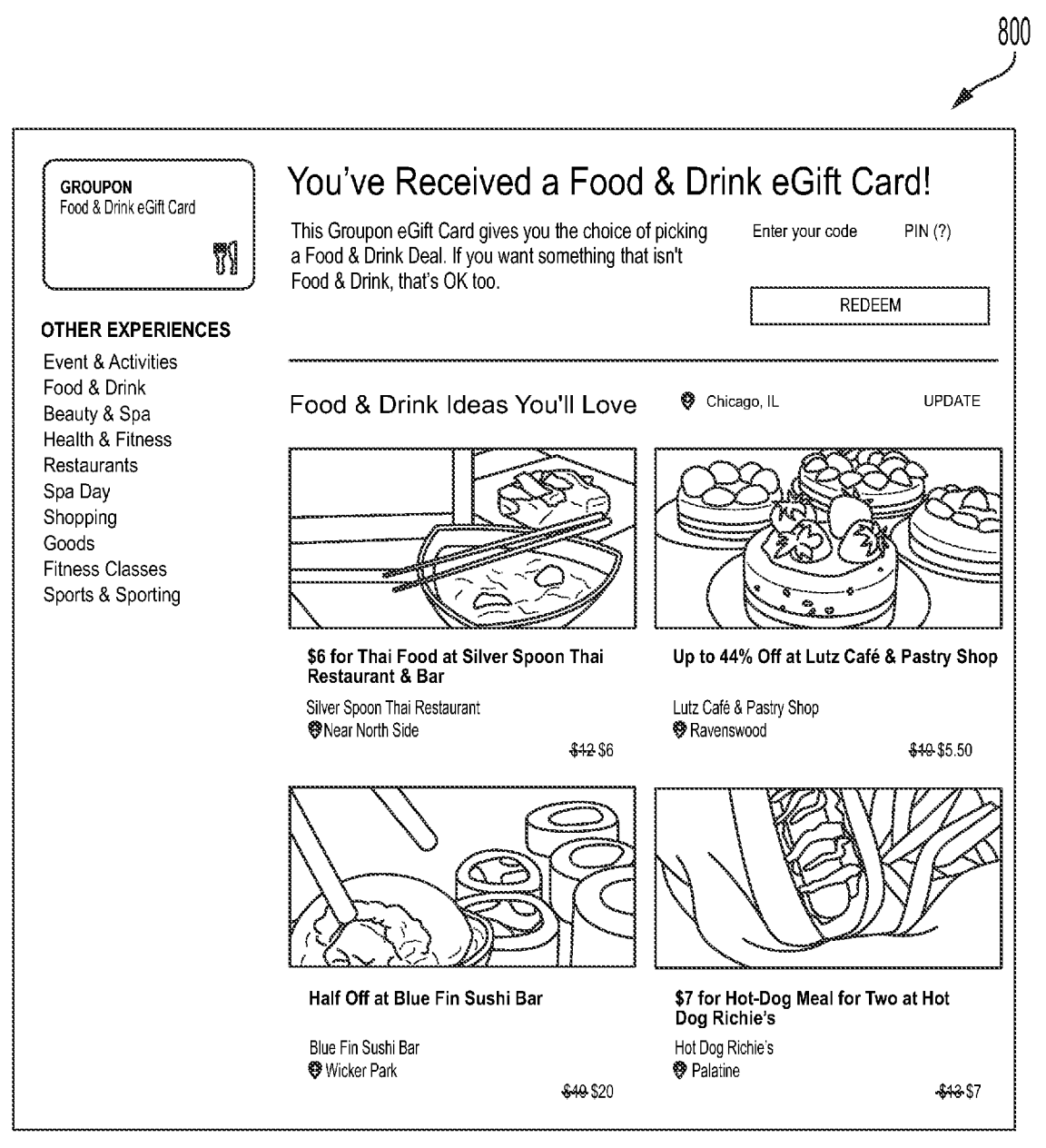

FIG. 8 illustrates an example interface for selecting a promotion upon which to use a promotion voucher in accordance with some example embodiments;

FIG. 9 illustrates a flowchart describing example operations for generating a promotion voucher in accordance with some example embodiments; and FIG. 10 illustrates a flowchart describing example operations for redeeming a promotion voucher in accordance with some example embodiments.

DETAILED DESCRIPTION

Overview

A method, apparatus, and computer program product are provided in accordance with an example embodiment of the present invention in order to provide for the use of promotion vouchers. In various scenarios, consumers may wish to purchase promotions they do not intend to use. For example, a consumer may wish to give a gift of a promotion to another consumer. However, it may not be easy for a given consumer to predict precisely which promotions may be of interest to the recipient of the gift. For example, the gifting consumer may not know which merchants are preferred by the recipient consumer, or the gifting consumer may live in a different geographical location and not have ready access to promotions that are local to the recipient consumer. The gifting consumer may likewise prefer not to give a "cash value" promotion, as such gifts may be viewed by some consumers as impersonal or less thoughtful than a gift of a particular promotion. As a result of these problems and others that may arise from time to time, consumers may be less likely to purchase promotions as gifts for other consumers, even though such gifts may offer additional value to recipient consumers due to the additional discounts offered by the promotions.

As such, to overcome these problems, example embodiments of the instant invention may provide for generation and transfer of promotion vouchers, which may be gifted from a gifting consumer to a recipient consumer and redeemed by the recipient consumer. A gifting consumer may select particular rules and/or parameters for a gifted promotion voucher to personalize the gift of the promotion voucher while still providing a flexible instrument that may be redeemed by the recipient consumer for a promotion of interest to the recipient consumer. For example, these promotion vouchers may be associated with a particular type of promotion or promotions for which they may be redeemed. In some embodiments, the particular type of promotion may be a suggested promotion type, and a promotion and marketing system may present promotions of the suggested promotion type to the recipient consumer for redemption, though the promotion voucher may be redeemable for promotions other than promotions of the suggested type. Alternatively, promotion vouchers may be tied to the particular promotion type such that the promotion voucher may only be redeemed to purchase a promotion of the particular promotion type. Although promotion vouchers are generally described in the context of a gifting consumer and a recipient consumer, it should be readily apparent that promotion vouchers may also be generated and provided by merchants and other users. For example, a merchant may generate multiple promotion vouchers to give away to recipients in exchange for a particular promotion associated with the merchant.

Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling well or that sales of the product or service result in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

As used herein, the term "promotion voucher" should be understood to refer to a token, credit, card, code, or the like that may be redeemed by a consumer in exchange for one or more promotions, or used as a credit to be used toward purchasing a promotion. Promotion vouchers may be stored balance cards, such as gift cards, gift codes, or the like which may be used with a promotion and marketing system to obtain promotions. For example, a promotion voucher may include a $50 credit to be used towards purchasing one or more promotions by a consumer. In some embodiments, promotion vouchers may be associated with a particular promotion, set of promotions, promotion type, or the like. For example, a promotion voucher may be associated with "food and drink" promotions. When redeeming such a promotion, the consumer may be presented with a list of food and drink promotions on which the consumer may use the promotion voucher. In some embodiments, promotion vouchers are only redeemable for promotions of the particular associated type, while in other embodiments promotion vouchers may be redeemed for any promotion offered by the promotion and marketing system. In yet further embodiments, certain promotion types may be presented as "preferred" promotions for a particular voucher (e.g., displayed upon redemption of the associated promotion voucher), but the consumer may still select any promotion offered by the promotion and marketing system, even a promotion other than the promotion type associated with the promotion voucher.

Technical Underpinnings and Implementation of Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

To further sales and assist with marketing efforts, many retailers and payment processors have begun to offer "stored balance" cards or "gift" cards. These cards allow for a consumer to purchase a credit which is redeemable for a particular amount of products or services. Although the products and services frequently correspond to the purchase price of the stored balance card, in some scenarios the value assigned to a stored balance card may be determined based on other factors. For example, some stored balance cards may have a value corresponding to a refund granted by a retailer (e.g., where the consumer does not have a receipt for a returned item), and other stored balance cards may be sold at a discount, where the balance of products or services for which the stored balance card may be redeemed is in excess of the amount paid for the card.

Various redemption methods for stored balance cards exist. Some stored balance cards are processed in the same manner as credit cards or debit cards, using the same payment systems, while other stored balance cards utilize systems that are internal to the particular merchant with which the stored balance cards are associated. Some stored balance cards may be redeemed at multiple retailers (e.g., at one of several restaurant chains run under the same ownership), while other stored balance cards can be redeemed anywhere that a particular payment system is accepted (e.g., a particular credit card brand associated with the stored balance card).

The inventors have determined that existing systems for processing of payments using stored balance cards are inadequate due to several technological obstacles. For example, current systems for accepting payment using stored balance cards are agnostic to the goods and services purchased as long as the stored balance card is accepted by the particular merchant offering the goods and services. Although in many scenarios such a state is desirable, as it gives consumers enhanced flexibility in how they choose to spend their purchase, in other scenarios a consumer may wish to constrain the goods or services available to be purchased by the stored balance card, such as where a first consumer wishes to give a gift to a second consumer of a good or service of a particular category (e.g., a restaurant dinner) without choosing the exact good or service to be gifted (e.g., the particular restaurant). The inventors have developed technological improvements to a point-of-sale system and a payment processing system that allow for the use of novel electrical data signals to improve the operation of said points-of-sale and payment processing systems.

Furthermore, the inventors have identified that, when a stored balance card is tied to a particular set of goods and services, systems may leverage knowledge that the particular stored balance card is associated with a particular user, and improve the generation of electronic marketing communications generated for that particular user. In this manner, the inventors have developed technological improvements to systems for generating such electronic marketing communications that use electronic marketing information associated with a particular stored balance card to improve the process by which electronic marketing communications are programmatically generated. This has the effect of improving the artificial intelligence by which such electronic marketing communications are generated.

System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Merchants may access a promotion and marketing service 102 via a network 112 (e.g., the Internet, or the like) using computer devices 108A through 108N and 110A through 110N, respectively (e.g., one or more consumer devices 108A-108N or one or more merchant devices 110A-110N). Moreover, the promotion and marketing service 102 may comprise a server 104 in communication with a database 106.

The server 104 may be embodied as a computer or computers as known in the art. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction information provided by the consumer devices 108 and/or the merchant devices 110. The server 104 may facilitate the generation and providing of various electronic communications and marketing materials based on the received electronic data.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and consumers, data indicating the products and promotions offered by the promotion and marketing service, clickstream data, analytic results, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing service 102 via a web browser. As yet another example, the consumer device 108 may include various hardware or firmware designed to interface with the promotion and marketing service 102 (e.g., where the consumer device 108 is a purpose-built device offered for the primary purpose of communicating with the promotion and marketing service 102, such as a store kiosk).

The merchant devices 110A-110N may be any computing device as known in the art and operated by a merchant. For example, the merchant devices 110A-110N may include a merchant point-of-sale, a merchant e-commerce server, a merchant inventory system, or a computing device accessing a web site designed to provide merchant access (e.g., by accessing a web page via a browser using a set of merchant account credentials). Electronic data received by the promotion and marketing service 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing service 102 to enable the promotion and marketing service 102 to generate promotions or other marketing information to be provided to consumers.

An example of a data flow for exchanging electronic information among one or more consumer devices, merchant devices, and the promotion and marketing service is described below with respect to FIG. 4.

Example Apparatuses for Implementing Embodiments of the Present Invention

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, voucher creation circuitry 210, and voucher redemption circuitry 212. The apparatus 200 may be configured to execute the operations described above with respect to FIG. 1 and below with respect to FIGS. 4 and 8-9. Although these components 202-212 are described with respect to functional limitations, it should be understood that the particular implementations necessarily include the use of particular hardware. It should also be understood that certain of these components 202-212 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or coprocessor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The voucher creation circuitry 210 may be operable to generate one or more promotion vouchers for use with the promotion and marketing system. For example, the voucher creation circuitry 210 may provide an interface allowing a gifting consumer to select one or more parameters for a promotion voucher to be provided to a recipient consumer. The voucher creation circuitry 210 may, for example, be operable to allow the gifting consumer to select a value for the promotion voucher (e.g., a credit amount provided towards a promotion purchase on the promotion and marketing service), a promotion type for redemption (e.g., a particular category or categories of promotions for which the promotion voucher may be redeemed), a location or locations associated with the promotion voucher (e.g., a defined geographic region associated with a set of promotions for which the voucher may be redeemed), and the like.

The various promotion voucher parameters may be utilized by the gifting consumers to personalize and/or customize the promotion voucher for particular gifting scenarios and use cases. For example, a gifting consumer may wish to give the recipient consumer a meal at a fine dining establishment. However, the gifting consumer may not be aware of the recipient consumer's particular tastes, likes, or dislikes, or the gifting consumer may not be familiar with fine dining establishments in the recipient consumer's locale. In such a scenario, the gifting consumer may indicate via the voucher creation module 210 that the promotion voucher is redeemable for a promotion offered by a fine dining establishment, such that the recipient consumer may select any fine dining promotion to redeem the promotion voucher.

In another example scenario, a gifting consumer may wish to provide a recipient consumer with a promotion to be used on the recipient consumer's upcoming vacation to a particular resort. The gifting consumer may associate the promotion voucher with the location of the resort, such that the promotion voucher is redeemable for a promotion associated with a merchant at the particular location (e.g., if the recipient consumer has an upcoming honeymoon in Hawaii, the gifting consumer may provide a promotion voucher redeemable for a promotion associated with a merchant in Hawaii). As yet another example, a gifting consumer may wish to provide a recipient consumer with a promotion voucher for a weekend getaway, which includes a promotion for two nights at a bed and breakfast, dinner at a restaurant, and transportation to the bed and breakfast. The gift recipient of such a promotion voucher may be presented with multiple choices of bed and breakfasts, restaurants, and transportation options, such that the gift recipient is entitled to select one of each promotion type in exchange for the promotion voucher. It should be readily appreciated that promotion vouchers may be redeemable for particular promotions (e.g., a promotion voucher good for any one restaurant promotion), or promotion vouchers may be associated with a particular credit amount (e.g., a promotion voucher good for $50 in spending via the promotion and marketing service). In some embodiments, promotions may have additional or alternative restrictions. For example, a given promotion voucher may be redeemable for any promotion under a certain dollar value (e.g., a promotion voucher good for any restaurant promotion under $50). Such restrictions may be selectable by the gifting consumer during creation of the promotion voucher.

The voucher creation circuitry 210 may also allow the gifting consumer to specify a particular recipient consumer of the promotion voucher. For example, the gifting consumer may indicate a particular e-mail address, cellular phone number, promotion and marketing service account identifier, or the like to receive the promotion voucher. In some embodiments, the voucher creation circuitry 210 may notify the recipient consumer of the promotion voucher, such as by sending the recipient consumer an e-mail, a cellular text message, a telephone call, a notification on the recipient consumer's promotion and marketing service account, or the like. In some embodiments, the voucher creation circuitry 210 may also associate a promotion voucher with the recipient consumer's account, allowing for redemption at a later time.

The voucher redemption circuitry 212 may serve to allow a recipient consumer to redeem a promotion voucher for one or more promotions via the promotion and marketing service. The voucher redemption circuitry 212 may allow a recipient consumer to select a promotion voucher and view promotions associated with the promotion voucher. For example, the voucher redemption circuitry 212 may present the recipient consumer with a selection of promotions that have the same promotion type as a promotion type associated with a promotion voucher. The recipient consumer may be allowed to select one or more of these promotions to be received by the recipient consumer in exchange for the promotion voucher. As described above, in some embodiments the promotion voucher adds a defined credit to the recipient consumer's account, which may be redeemed for promotions using the promotion and marketing service, while in other embodiments the promotion voucher is redeemable for one or more particular promotions of a particular type. The voucher redemption circuitry 212 may perform a variety of administrative and management functions relating to the promotion voucher, including but not limited to removing the promotion voucher from the recipient upon redemption, verifying promotion codes provided by a recipient consumer for authenticity, notifying a gifting consumer that a promotion voucher has been redeemed, or the like.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

In FIG. 3, the apparatus 300, which may embody sales representative device 114, a merchant device 116, or a consumer device 118 may include or otherwise be in communication with a processor 302, a memory 304, communications circuitry 308, and a user interface 306. In some embodiments, the processor (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 302 may be embodied in a number of different ways and may, for example include one or more processing devices configured to perform independently. Additionally or alternatively, the processor may include one or more processors configured in tandem via a bus to enable independent execution of instructions, pipelining, and/or multithreading.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 300 may include a user interface 306 that may, in turn, be in communication with processor 302 to provide output to the user and, in some embodiments, to receive an indication of a user input. As such, the user interface may include a display and may comprise a web user interface, a mobile application, a client device, a kiosk, or the like. In some embodiments, the user interface 306 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

Meanwhile, the communications circuitry 308 may be any means such as a device or circuitry embodied in either hardware or a combination of hardware and software that is configured to receive and/or transmit data from/to a network and/or any other device or module in communication with the apparatus 300. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna (s) or to handle receipt of signals received via the antenna(s). In some environments, the communication interface may additionally or alternatively support wired communication. As such, for example, the communication interface may include a communication modem and/or other hardware/ software for supporting communication via cable, digital subscriber line (DSL), universal serial bus (USB), or other mechanisms.

Example Electronic Marketing Information Service Data Flow

FIG. 4 depicts an example data flow 400 illustrating interactions between a server 402, one or more consumer devices 404, and one or more merchant devices 406. The server 402 may be implemented in the same or a similar fashion as the server 104 as described above with respect to FIG. 1, the one or more consumer devices 404 may be implemented in the same or a similar fashion as the consumer devices 108A-108N as described above with respect to FIG. 1, and the one or more merchant devices 406 may be implemented in the same or a similar fashion as the merchant devices 110A-110N as described above with respect to FIG. 1.

The data flow 400 illustrates how electronic information may be passed among various systems when employing a server 402 in accordance with embodiments of the present invention. The one or more consumer devices 404 and/or one or more merchant devices 406 may provide a variety of electronic marketing information to the server 402 for use in providing promotion and marketing services to the consumer. This electronic marketing information may include, but is not limited to, location data, clickstream data, transaction data, communication channel data, and/or discretionary data.

As a result of transactions performed between the one or more consumer devices 404 and the server 402, the server 402 may provide fulfillment data to the consumer devices. The fulfillment data may include information indicating whether the transaction was successful, the location and time the product will be provided to the consumer, instruments for redeeming promotions purchased by the consumer, or the like. The server 402 may provide point-of-sale functionality, transaction/payment processing functionality, and the like. In particular, embodiments as described herein provide improvements to aspects of the server relating to payment systems and programmatic generation of electronic marketing communications.

In addition to the e-commerce interactions with the one or more consumer devices 404 offered by the server 402, the server 402 may leverage information provided by the consumer devices to improve the relevancy of marketing communications to individual consumers or groups of consumers. In this manner, the server 402 may determine promotions, goods, and services that are more likely to be of interest to a particular consumer or group of consumers based on clickstream data, location data, and other information provided by and/or relating to particular consumers, including but not limited to information associated with promotion vouchers associated with the particular consumer account. For example, the server 402 may detect the location of a consumer based on location data provided by the consumer device, and offer promotions based on the proximity of the consumer to the merchant associated with those promotions.

Alternatively, the server 402 may note that the consumer has an interest in a particular hobby (e.g., skiing) based on electronic marketing information associated with the consumer (e.g., a browser cookie that indicates they frequently visit websites that provide snowfall forecasts for particular ski resorts), and offer promotions associated with that hobby (e.g., a promotion offering discounted ski equipment rentals or lift tickets). It should be appreciated that a variety of different types of electronic marketing information could be provided to the server 402 for the purpose of improving the relevancy of marketing communications. It should also be appreciated that this electronic marketing information may be received from a variety of electronic sources, including various consumer devices, merchant devices, and other sources both internal and external to a promotion and marketing service. For example, other data sources may include imported contact databases maintained by merchants, electronic survey questions answered by consumers, and/or various other forms of electronic data.

It should also be appreciated that the server 402 may also control other factors of the electronic marketing communications sent to the consumer other than the particular promotions included in the electronic marketing communication. For example, the server 402 may determine the form, structure, frequency, and type of the electronic marketing communication. As with the content of the electronic marketing communication, these factors may be programmatically determined according to various methods, factors, and processes based on electronic data received by the server 402 for the purpose of maximize the likelihood that the communication will be relevant to the recipient consumer.

The server 402 interactions with the one or more merchant devices 406 may be related to enabling the merchant to market their products using a promotion and marketing service. For example, the one or more merchant devices 406 may provide promotion data defining one or more promotions to be offered by the promotion and marketing service on behalf of the merchant. The server 402 may receive this information and generate information for providing such promotions via an e-commerce interface, making the promotions available for purchase by consumers. The server 402 may also receive information about products from the one or more merchant devices 406. For example, a merchant may provide electronic marketing information indicating particular products, product prices, inventory levels, and the like to be marketed via a promotion and marketing service. The server 402 may receive this information and generate listing information to offer the indicating products to consumers via a promotion and marketing service.

The one or more merchant devices 406 may also receive information from the server 402. For example, in some embodiments a merchant may obtain access to certain business analytic data aggregated, generated, or maintained by the server 402. As a particular example, a merchant might offer to pay for consumer demographic data related to products or services offered by the merchant. It should be appreciated however, that a merchant may not need to list any products or services via the promotion and marketing service in order to obtain such data. For example, the promotion and marketing service may enable merchants to access electronic marketing data offered via the promotion and marketing service based on a subscription model. The one or more merchant devices 406 may also receive electronic compensation data from the server 402. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

Embodiments advantageously provide for improvements to the server by improving payment systems. In particular, embodiments allow for the redemption mechanism used to exchange a promotion voucher for a promotion to be aware of the particular type of promotion for which the voucher is being redeemed, thus allowing the payment processing system to approve or deny the transaction based on the type of promotion and a type of promotion associated with the promotion voucher. Embodiments further provide for technological improvements to artificial intelligence systems used to programmatically generate electronic marketing communications.

Example Interface Illustrations

As described above, example embodiments may function to provide gifting consumers with control over how promotion vouchers are generated, and to allow recipient consumers to redeem said promotion vouchers in accordance with the parameters of said promotion vouchers. FIGS. 5-8 illustrate example interfaces for performing various operations for generating and redeeming promotion vouchers.

Turning first to FIG. 5, FIG. 5 illustrates an example interface 500 for selecting a promotion voucher to be generated. The interface 500 allows a gifting consumer to select a type and denomination for the promotion voucher. In the instant example, the displayed promotion voucher is a "food and drink" promotion voucher, with a denomination of $35. As such, this promotion voucher would be redeemable for up to $35 in purchases via the promotion and marketing service. Since the promotion voucher is associated with food and drink, the recipient consumer might be prompted with food and drink promotions upon redemption. In the present example, the promotion voucher is noted as redeemable for other types of promotions as well, though it should be appreciated that in some embodiments the promotion voucher may only be redeemed for promotions of the designated type associated with the promotion voucher. It should also be appreciated that the gifting consumer may be presented with other parameters for selection with the promotion voucher. For example, the gifting consumer may control other aspects of the redemption of the promotion such as specifying a location, a time or date range, or the like, to control when and how the promotion voucher is redeemed. In some embodiments, the interface 500 may also provide the gifting consumer with options for how the recipient consumer is notified of the promotion. For example, the interface 500 may include one or more fields allowing the gifting consumer to specify an e-mail address, account identifier, phone number, or the like for the recipient consumer. In some embodiments, the gifting consumer may also specify cosmetic and/or aesthetic attributes of the promotion voucher, such as a display image, a font type, a background image, or the like. In some embodiments, the gifting consumer may specify a particular occasion, holiday, or the like for the gift of the promotion voucher and the promotion voucher may be altered in appearance accordingly.

Turning to FIG. 6, FIG. 6 depicts an illustration of an interface 600 as received by the recipient of the promotion voucher. In the instant illustration, the promotion voucher is depicted as an e-mail or message received via a promotion and marketing service interface. The interface 600 may provide text indicating the gifting consumer to notify the recipient consumer from whom the promotion voucher was received. The interface 600 also includes an interface control allowing for the recipient consumer to associate the promotion voucher with the recipient consumer's account. Upon selection of the interface control, the recipient consumer may be taken to a web page associated with the promotion and prompting the recipient consumer for account credentials. Upon receiving the recipient consumer's account credentials, the promotion voucher may be applied to the account associated with the recipient consumer's account credentials.

FIG. 7 depicts an illustration of an interface 700 for displaying a promotion voucher. The interface 700 may be displayed upon activating a link associated with the promotion voucher, such as upon selection of an interface control as displayed in the interface 600 as described above. The interface 700 may notify the recipient user of the value of the promotion voucher ($15 in the instant example), the type of the promotion voucher (food and drink, in the instant example), and various terms and conditions for using the promotion voucher. In some embodiments, the interface 700 may provide a redemption code for use with a promotion and marketing service to associate the promotion voucher with a user's account. In some embodiments, the interface 700 is provided as a web page associated with a particular link, such as a link attached to the interface control as displayed in the interface 600 described above.

FIG. 8 depicts an illustration of an interface 800 for displaying one or more promotions associated with a redeemed promotion voucher. The interface 800 depicts several promotions associated with the "food and drink" category that are displayed to a recipient consumer in response to the recipient consumer redeeming a "food and drink" promotion voucher. The promotions displayed within the interface 800 may be determined based on one or more factors of the recipient consumer and the promotion voucher. For example, promotions may be selected for display based on the location of the recipient consumer, while a category of the displayed promotions may be determined based on parameters of the promotion voucher (e.g., food and drink promotions because the voucher is a food and drink voucher).

Example Methods for Generating and Redeeming a Promotion Voucher

FIG. 9 illustrates a flowchart describing example operations for generating a promotion voucher, in accordance with some example embodiments. The method 900 describes a process by which a gifting consumer may determine one or more parameters for a promotion voucher, and generate the promotion voucher for assignment to a recipient consumer. The method 900 may employed by an apparatus, such as the apparatus 200 described above with respect to FIG. 2, or processing means, such as the processor 202, to generate and send an electronic communication.

At action 902, a set of parameters are received for a promotion voucher. The parameters may be provided by a gifting consumer as described above. As described above, the parameters may include a type of promotion, an intended recipient, a promotion voucher value, an associated location, or the like. The parameters may be provided as part of a purchasing operation performed by the gifting consumer, such as through an e-commerce web interface provided by a promotion and marketing service. In some embodiments, the e-commerce web interface may provide a series of fillable forms, drop down boxes, and the like for selecting the promotion parameters. In some embodiments, the e-commerce web interface may allow the gifting consumer to select particular promotions or types of promotions for association with the promotion voucher, and determine the promotion voucher parameters based on the selected promotions or types of promotion. In some embodiments, the promotion parameters may include multiple promotion types, merchant types, or the like. The promotion voucher parameters may be received by an apparatus, such as the apparatus 200, or processing means, such as the processor 202.

At action 904, the promotion voucher may be associated with a particular promotion type. The promotion type may be determined based on the promotion parameters received at action 902. As described above, the promotion type associated with the promotion voucher may determine which promotions are suggested upon redemption of the promotion voucher by the recipient consumer. The associated promotion type may be mandatory (e.g., only promotions of the promotion type can be received in response to redemption of the promotion voucher) or optional (e.g., promotions of the promotion type are suggested, but the promotion voucher may also be redeemed for promotions not of the promotion type). When the promotion voucher is generated, it may be stored in a memory (e.g., a promotion database or promotion voucher databases) along with the associated promotion type. The promotion voucher may be associated with the promotion type by an apparatus, such as the apparatus 200, or processing means, such as the processor 202.

At action 906, the promotion voucher may be assigned to a recipient consumer. Assignment of the promotion voucher to the recipient consumer may include sending a message (e.g., an e-mail or short message service (SMS) message) to the recipient consumer with a unique identifier code associated with the promotion. Additionally or alternatively, assignment of the promotion voucher may include associating the promotion voucher with a user account associated with the recipient consumer, without the need for the recipient consumer to enter the unique identifier code. In yet further embodiments, the promotion voucher may be transmitted or mailed to the gifting consumer for presentation to the recipient consumer (e.g., as a physical gift card with a unique identifier printed thereon). The promotion voucher may be assigned to the recipient consumer by an apparatus, such as the apparatus 200, or processing means, such as the processor 202.

FIG. 10 illustrates a flowchart describing example operations for redeeming a promotion voucher in accordance with some example embodiments. The method 1000 describes a process by which a promotion voucher may be redeemed to obtain one or more promotions via a promotion and marketing service. The method 1000 may be performed by an apparatus, such as the apparatus 200, or processing means, such as the processor 202.

At action 1002, an indication of promotion voucher redemption is received. The indication may include any notification by the recipient consumer that the recipient consumer wishes to use the promotion voucher towards a promotion provided by the promotion and marketing system. For example, the indication may include a recipient consumer indicating they wish to purchase a promotion using an account that is associated with the promotion voucher. Alternatively, the indication may be the recipient consumer entering a unique identifier associated with the promotion. The indication may be received as part of an e-commerce transaction initiated by the recipient consumer, such as when purchasing a promotion. The indication may be received by an apparatus, such as the apparatus 200, or processing means, such as the processor 202.

At action 1004, a promotion type associated with the promotion voucher is determined. As described above, the promotion voucher may be associated with a particular promotion type, merchant type, or the like. The promotion type may be stored along with an identifier for the promotion voucher, such as a record stored in a database. The promotion type may be determined by an apparatus, such as the apparatus 200, or processing means, such as the processor 202.

At action 1006, one or more promotions associated with the promotion type are presented. Presentation of the promotions may include determining which promotions correspond to the promotion type determined at action 1004, and displaying the promotions to the recipient consumer. In some embodiments, the displayed promotions are determined based on the location of the recipient consumer and the type of the promotion, such as identifying restaurants within a predefined radius of the recipient consumer if the promotion voucher is a "food or drink" voucher. As described above, the promotions presented to the recipient consumer may not be the only available promotions for redemption of the promotion voucher. For example, the promotions presented to the recipient consumer may just be suggestions, and the promotion voucher may be redeemable for any promotion or as a credit towards any promotion offered by the promotion and marketing service. Presentation of the promotions may include allowing the recipient consumer to select one or more of the promotions for redemption. Upon redemption, the selected promotions may be provided to the recipient consumer and the promotion voucher may be consumed. In some embodiments, the promotion voucher may be associated with a particular value (e.g., $25, $50, $100), and the promotion voucher may be partially consumed, with some value remaining for redemption after a promotion is purchased.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method comprising:
receiving, by a processor via a wireless network interface and a user interface form rendered via a first display of a first user device associated with a first user, discretionary data and promotion parameters comprising a first promotion type selected from a plurality of promotion types;
generating, by the processor, a promotion voucher based at least in part on the discretionary data and the promotion parameters, wherein the promotion voucher is associated with the first promotion type, and wherein the promotion voucher is further associated with an indication of whether the first promotion type is a mandatory constraint or an optional constraint;
transmitting, by the processor via the wireless network interface to a second user device associated with a recipient, the promotion voucher and at least a first suggested promotion of the first promotion type based on an identification of the recipient comprising one or more of an account identifier, a phone number, or an email address of the recipient associated with recipient account data, wherein the first suggested promotion is selected for transmission based on the indication of whether the first promotion type is the mandatory constraint or the optional constraint;
monitoring, by the processor, for input of recipient account credentials by the recipient with a user interface of the second user device;
responsive to detecting, by the processor, the input of recipient account credentials based at least in part on the monitoring and subsequently validating the recipient account credentials, associating at least the promotion voucher with the recipient account data based at least in part on identifying and locating the recipient account data within a database using the recipient account credentials; and
subsequent to receiving, by the processor via the wireless network interface from the second user device associated with the recipient, an indication of an intended redemption of the promotion voucher by the recipient to which the promotion voucher was provided, the indication comprising the recipient account data, a unique identifier code associated with the promotion voucher, and a location of the second user device, wherein the location of the second user device comprises a global positioning service-based real-time position estimate of the second user device associated with a moment in time substantially concurrent with the second user device transmitting the indication of an intended redemption:
retrieving, by the processor, at least a second suggested promotion based at least in part on a proximity to the location of the second user device and a second promotion type selected from the plurality of promotion types based on at least the recipient account data;
transmitting, by the processor via the wireless network interface to the second user device associated with the recipient, an e-commerce interface renderable via a second display of the second user device, the e-commerce interface comprising at least the second suggested promotion for purchase using the promotion voucher;
monitoring, by the processor, for clickstream data indicative of recipient interactions with the e-commerce interface including selection of a selected promotion for purchase;
responsive to detecting the selection of a selected promotion for purchase by the recipient in the clickstream data, automatically associating, by the processor, the selected promotion with the recipient account data; and providing, by the processor via the wireless network interface, electronic compensation data to a merchant associated with the selected promotion, wherein the electronic compensation data describes to the merchant a redemption of the promotion voucher for the selected promotion.

2. The computer-implemented method of claim 1, further comprising, subsequent receiving, by the processor, the indication of the intended redemption of the promotion voucher;

retrieving, by the processor, one or more promotions that correspond to another promotion parameter of the promotion parameters; and transmitting, by the processor, to the recipient the one or more promotions for purchase using the promotion voucher.

3. The computer-implemented method of claim 2, wherein the promotion voucher is only redeemable for one or more promotions of the first promotion type.

4. The computer-implemented method of claim 2, wherein the promotion voucher is associated with a particular promotion and is redeemable for a promotion other than the particular promotion.

5. The computer-implemented method of claim 2, wherein the promotion parameters further comprise multiple promotion types.

6. The computer-implemented method of claim 1, wherein a type of promotion comprises a merchant type.

7. The computer-implemented method of claim 1, wherein a type of promotion comprises a plurality of promotion merchant categories, and wherein the promotion voucher is redeemable for a promotion of each of the plurality of promotion merchant categories.

8. The computer-implemented method of claim 1, wherein a promotion is associated with a plurality of promotion types.

9. The computer-implemented method of claim 1, wherein the e-commerce interface comprises a current location of a merchant device associated with one or more of the promotion voucher, the first suggested promotion, or the second suggested promotion.

10. The computer-implemented method of claim 9, wherein the merchant device is associated with a mobile merchant comprising one or more of a food truck or a delivery service.

11. An apparatus comprising at least one processor and a memory, the memory comprising instructions that, when executed by the at least one processor, cause the at least one processor to configure the apparatus to:

receive, via a wireless network interface and a user interface form rendered via a first display of a first user device associated with a first user, discretionary data and promotion parameters comprising a first promotion type selected from a plurality of promotion types;

generate a promotion voucher based at least in part on the discretionary data and the promotion parameters, wherein the promotion voucher is associated with the first promotion type, and wherein the promotion voucher is further associated with an indication of whether the first promotion type is a mandatory constraint or an optional constraint;

transmit, via the wireless network interface to a second user device associated with a recipient, the promotion voucher and at least a first suggested promotion of the first promotion type based on an identification of the recipient comprising one or more of an account identifier, a phone number, or an email address of the recipient associated with recipient account data, wherein the first suggested promotion is selected for transmission based on the indication of whether the first promotion type is the mandatory constraint or the optional constraint;

monitor for input of recipient account credentials by the recipient with a user interface of the second user device;

responsive to detection of input of recipient account credentials based at least in part on the monitoring and subsequent validation of the recipient account credentials, associate at least the promotion voucher with the recipient account data based at least in part on identifying and locating the recipient account data within a database using the recipient account credentials; and subsequent to receiving, via the wireless network interface from the second user device associated with the recipient, an indication of an intended redemption of the promotion voucher by the recipient to which the promotion voucher was provided, the indication comprising the recipient account data, a unique identifier code associated with the promotion voucher, and a location of the second user device, wherein the location of the second user device comprises a global positioning service-based real-time position estimate of the second user device associated with a moment in time substantially concurrent with the second user device transmitting the indication of an intended redemption:

retrieve at least a second suggested promotion based at least in part on a proximity to the location of the second user device and a second promotion type selected from the plurality of promotion types based on at least the recipient account data;

transmit, via the wireless network interface to the second user device associated with the recipient, an e-commerce interface renderable via a second display of the second user device, the e-commerce interface comprising at least the second suggested promotion for purchase using the promotion voucher;

monitor for clickstream data indicative of recipient interactions with the e-commerce interface including selection of a selected promotion for purchase;

responsive to detecting the selection of a selected promotion for purchase by the recipient in the clickstream data, automatically associate, by the processor, the selected promotion with the recipient account data; and provide, via the wireless network interface, electronic compensation data to a merchant associated with the selected promotion, wherein the electronic compensation data describes to the merchant a redemption of the promotion voucher for the selected promotion.

12. The apparatus of claim 11, further configured to, subsequent receiving the indication of the intended redemption of the promotion voucher;

retrieve one or more promotions that correspond to another promotion parameter of the promotion parameters; and transmit to the recipient the one or more promotions for purchase using the promotion voucher.

13. The apparatus of claim 12, wherein the promotion voucher is only redeemable for one or more promotions of the first promotion type.

14. The apparatus of claim 12, wherein the promotion voucher is associated with a particular promotion and is redeemable for a promotion other than the particular promotion.

15. The apparatus of claim 11, wherein the promotion parameters further comprise multiple promotion types.

16. The apparatus of claim 11, wherein a type of promotion comprises a merchant type.

17. The apparatus of claim 11, wherein a type of promotion comprises a plurality of promotion merchant categories, and wherein the promotion voucher is redeemable for a promotion of each of the plurality of promotion merchant categories.

18. A non-transitory computer readable medium comprising instructions that, when executed by a processor, cause the processor to configure an apparatus to:

receive, via a wireless network interface and a user interface form rendered via a first display of a first user device associated with a first user, discretionary data and promotion parameters comprising a first promotion type selected from a plurality of promotion types;

generate a promotion voucher based at least in part on the discretionary data and the promotion parameters, wherein the promotion voucher is associated with the first promotion type, and wherein the promotion voucher is further associated with an indication of whether the first promotion type is a mandatory constraint or an optional constraint;

transmit, via the wireless network interface to a second user device associated with a recipient, the promotion voucher and at least a first suggested promotion of the first promotion type based on an identification of the recipient comprising one or more of an account identifier, a phone number, or an email address of the recipient associated with recipient account data, wherein the first suggested promotion is selected for transmission based on the indication of whether the first promotion type is the mandatory constraint or the optional constraint;

monitor for input for recipient account credentials by the recipient with a user interface of the second user device;

responsive to detection of input of recipient account credentials based at least in part on monitoring and subsequent validation of the recipient account credentials, associate at least the promotion voucher with the recipient account data based at least in part on identifying and locating the recipient account data within a database using the recipient account credentials; and subsequent to receiving, via the wireless network interface from the second user device associated with the recipient, an indication of an intended redemption of the promotion voucher by the recipient to which the promotion voucher was provided, the indication comprising recipient account data, a unique identifier code associated with the promotion voucher, and a location of the second user device, wherein the location of the second user device comprises a global positioning service-based real-time position estimate of the second user device associated with a moment in time substantially concurrent with the second user device transmitting the indication of an intended redemption:

retrieve at least a second suggested promotion based at least in part on a proximity to the location of the second user device and a second promotion type selected from the plurality of promotion types based on at least the recipient account data;

transmit, via the wireless network interface to the second user device associated with the recipient, an e-commerce interface renderable via a second display of the second user device, the e-commerce interface comprising at least the second suggested promotion for purchase using the promotion voucher;

monitor for clickstream data indicative of recipient interactions with the e-commerce interface including selection of a selected promotion for purchase;

responsive to detecting the selection of a selected promotion for purchase by the recipient in the clickstream data, automatically associate the selection promotion with the recipient account data; and provide, via the wireless network interface, electronic compensation data to a merchant associated with the selected promotion wherein the electronic compensation data describes to the merchant a redemption of the promotion voucher for the selected promotion.

* * * * *